(No Model.)

J. & E. E. SICKLER.
WIRE STRETCHER.

No. 333,787. Patented Jan. 5, 1886.

WITNESSES:
INVENTORS:

UNITED STATES PATENT OFFICE.

JACOB SICKLER, OF OTTERBEIN, AND EDWARD E. SICKLER, OF INDIANAPOLIS, INDIANA.

WIRE-STRETCHER.

SPECIFICATION forming part of Letters Patent No. 333,787, dated January 5, 1886.

Application filed July 21, 1884. Serial No. 138,312. (No model.)

*To all whom it may concern:*

Be it known that we, JACOB SICKLER, of Otterbein, in the county of Benton, and EDWARD E. SICKLER, of Indianapolis, in the county of Marion, State of Indiana, have invented certain new and useful Improvements in Wire-Stretchers, of which the following is a specification.

The object of our said invention is to produce a light, easily-operated, and inexpensive device for stretching wire, especially the wires of wire fences; and it consists in the combination and arrangement of the several parts, as will be hereinafter more particularly described and claimed.

Figure 2:
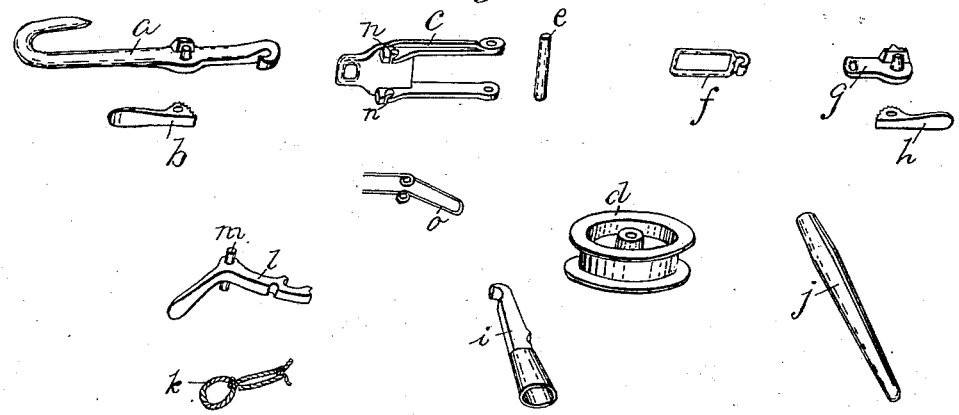
Figure 1:
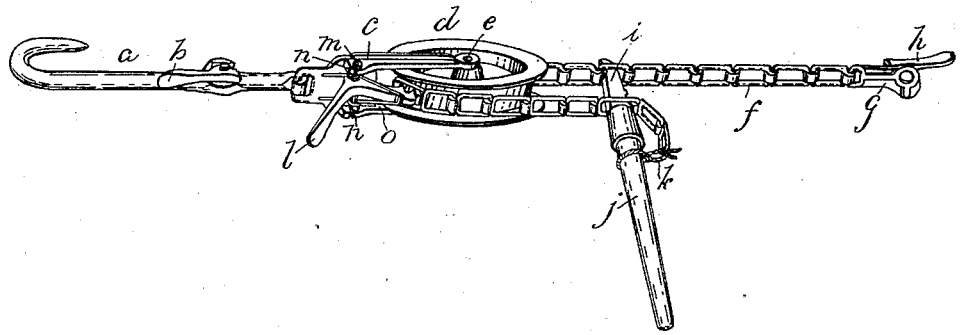

Referring to the accompanying drawings, which are made a part hereof, and on which similar letters of reference indicate similar parts, Figure 1 is a perspective view of our improved wire-stretcher; and Fig. 2 detail perspective views of the several parts thereof.

In said drawings, the portions marked $a$ represent the grappling-hook of our device; $b$, the wire-gripper secured to said hook; $c$, a clevis; $d$, a flanged sheave or wheel mounted on an axle in said clevis; $e$, the axle therefor; $f$, a chain running around said pulley; $g$, a plate upon one end of said chain; $h$, a wire-gripper thereon; $i j$, a lever for operating the stretcher; $k$, a rope or strap securing said lever to the chain; $l$, a pawl on the clevis $c$ for engaging the chain; $m$, its axle; $n n$, bearings therefor, and $o$ a spring for operating said pawl. The hook $a$ should have its short arm sharpened to a point, as it is thereby better enabled to engage with a post of any form, and we therefore prefer this sharp point as an engaging device, although any of the ordinary forms of engaging devices may be substituted therefor without departing from our invention. The other end, or end of the long arm of this hook, is curved or hooked to engage with an eye in the clevis $c$. The wire-gripper $b$ is placed at a convenient point upon the long arm of the hook $a$, and is adapted to engage with and hold one of the wire ends when the stretcher is used in splicing broken wires, or one of the two wires where the ends come together. It consists, simply, of a lug or projection upon the arm of the hook and a pivoted catch having a cam-shaped and serrated face, between which and said lug the wire is to be placed, and which grips the wire by the strain of the wire thereon. The clevis $c$ is formed with bearings for the axle of the wheel or sheave and for the spring catch or pawl, and also has an eye which engages with the hook $a$. The wheel or sheave $d$ is simply an idle-wheel around which the chain passes during the operation of the device. As this device is operated by a lever, and not by a crank or other means connected with this wheel or its axle, no sprockets are necessary thereon, and therefore they are usually and preferably omitted, leaving the periphery of the wheel smooth. The chain $f$ is preferably the flat cast-linked chain, but may be any chain having suitable open links to receive the lever. Upon one end is a device, $g$, having a projecting lug and a stud-pivot, and upon this stud-pivot is placed a gripper, $h$, in much the same manner as the gripper $b$ is placed upon the hook, and it operates in substantially the same manner.

The operating-lever consists, preferably, of two portions, the lower one, $i$, of metal, adapted to be inserted through the links of the chain and engage with both strands of said chain, as shown, and provided with a socket, and the other portion, $j$, preferably of wood, and adapted to enter said socket and afford a hand-piece or handle for the lever. The pawl $l$ is mounted in bearings $n n$, upon the clevis $c$, and is adapted to engage with and hold the several links of chain as they are drawn over the wheel or sheave by the action of the lever, and hold them in position. The spring $o$ operates to hold this pawl in engagement, as shown, and as will be readily understood.

As before indicated, the usual purpose which is effected by the use of our device is that of stretching ordinary fence-wire while it is being secured in position, or of drawing it together and splicing it when broken, and the operation of using it may be described as follows: The operator grasps the clevis $c$ in one hand, holding the outer end of the pawl $l$ within said hand, pressing it upon the clevis, and thus leave the chain $f$ free. The wire-gripper $h$ is now taken in the other hand, and the chain drawn out until the lever comes in contact with the pulley, said lever being generally secured to the chain at its other end by a rope or strap, k. The gripper h is then placed upon the wire at a proper distance from the post, and the hook a is placed upon or hooked into the post, preferably in such a manner that the point will draw into or around it, holding the machine firmly in the line of the wire. The operator then takes hold of the lever, and by drawing the chain around the wheel or sheave d, takes up the slack of the wire as far as his strength will permit, when the pawl l engages with and secures it at that point. He then inserts the lever through the loose strand of the chain and into the opposite strand, and draws the other end of the lever from the post, thus drawing the chain around the pulley and tightening the wire. As fast as the chain f is drawn up, the pawl engages therewith and retains whatever is gained. This operation is repeated until the wire is stretched to the desired tension. The use of a lever in this manner is a great advantage, as the stretcher may easily be held in any desired position thereby while in use, which is not the case with a crank.

In splicing a broken wire one end is placed in the gripper b at a proper distance from the end. The other end is fastened in the gripper h at a point leaving sufficient wire to reach and splice on the first wire when the wires are drawn up. The operation of drawing up is as described above.

We are aware that fence-stretchers embodying hooks, chains, chain-wheels, and wire-grippers have been heretofore employed, and we do not therefore desire to be understood as claiming these features, broadly; but we are not aware that any wire-stretcher has ever been produced embodying, in combination with chain and fastening devices, a loose or idle wheel or sheave and a lever adapted, by direct engagement with the strands of chain, to operate upon the same in the manner hereinbefore specified.

Having thus fully described our said invention, what we claim as new, and desire to secure by Letters Patent, is—

1. In a wire-stretcher, the combination of the post-hook, an idle chain wheel or sheave, a clevis in which said wheel is loosely mounted, a chain passing over said wheel, a wire-gripper, and a lever adapted to pass through the strands of the chain and engage with and operate upon both, substantially as described, and for the purposes specified.

2. The combination, in a wire-stretcher, of a post-hook carrying a wire-gripper, a clevis connected to said hook, an idle chain wheel or pulley mounted in said clevis, a spring-pawl pivoted upon said clevis and operating to engage with the chain, a chain passing over said wheel or pulley, a wire-gripper thereon, and a lever for operating upon said chain, substantially as set forth.

3. The combination, in a wire-stretcher, of a post-hook carrying a wire-gripper, and having a wheel or sheave and spring-pawl pivoted in the clevis formed upon or attached to the shank of said hook, a chain passing around said wheel and carrying a wire-gripper, and a lever adapted to engage with the opposite strands of said chain and operate to draw it around the pulley, substantially as set forth.

4. The combination, in a wire-stretcher, of a clevis, an idle chain wheel or sheave mounted therein, a pawl mounted on said clevis and adapted to engage with said chain as it passes over said wheel, a lever which is adapted to pass through the two strands of the chain, and thus draw said chain around said wheel, and devices for attaching the stretcher to the post and to the wire to be operated upon.

JACOB SICKLER.
EDWARD E. SICKLER.

Witnesses:
Z. A. SCOTT,
B. H. SICKLER.